United States Patent [19]

Dunn et al.

[11] Patent Number: 5,359,648
[45] Date of Patent: Oct. 25, 1994

[54] ESCAPE SEQUENCE USING MONITORING OF CONTROL SIGNAL STATES

[75] Inventors: Tave P. Dunn; Elie A. Jreij, both of Austin, Tex.; Richard M. Ludwin, Poughkeepsie, N.Y.; William E. Levene, Austin, Tex.

[73] Assignee: Rolm Company, Santa Clara, Calif.

[21] Appl. No.: 997,995

[22] Filed: Dec. 28, 1992

[51] Int. Cl.⁵ .................. H04M 11/00; H04L 5/16
[52] U.S. Cl. ............................. 379/93; 379/94; 375/8
[58] Field of Search ............... 379/93, 94, 96, 99, 379/98; 375/8, 9, 121, 104, 114

[56] References Cited

U.S. PATENT DOCUMENTS

| 4,549,302 | 10/1985 | Heatherington | 375/8 |
| 4,926,448 | 5/1990 | Kraul et al. | 375/121 |
| 4,928,305 | 5/1990 | Yui | 375/8 |

FOREIGN PATENT DOCUMENTS 0457704 11/1991 European Pat. Off. ............ 375/8

OTHER PUBLICATIONS

ROLMphone User's Manual; pp. 11-4 to 11-10.

*Primary Examiner*—Curtis Kuntz
*Assistant Examiner*—Jason Chan

[57] ABSTRACT

A method and apparatus for escaping from transparent mode in which the Data Communication Equipment will escape from transparent mode (into command mode) if a user programmed escape character string is received in coincidence with the toggling of a control signal such as Request To Send (RTS). Advantageously, this escape method can be used in conjunction with time/data escape methods that are based soley on activity on the received data line. When the two methods are used together, a supervisor program or control device can force an escape notwithstanding the user programmed time constraint parameters in the DCC.

17 Claims, 4 Drawing Sheets

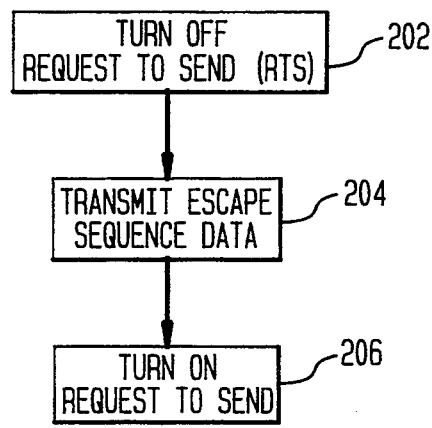
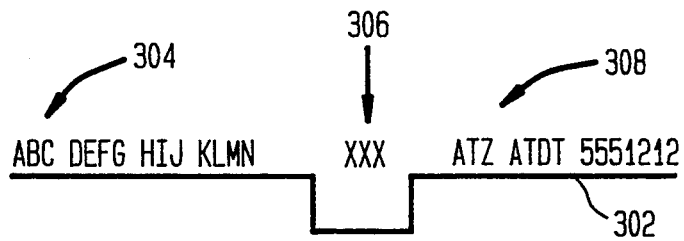
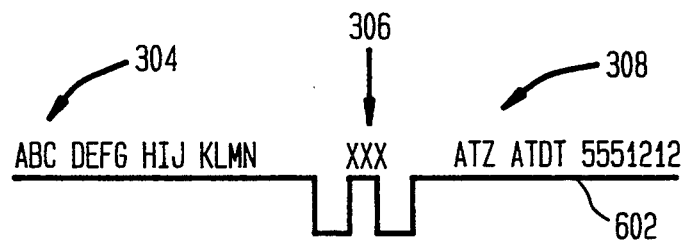

ESCAPE SEQUENCE USING MONITORING OF CONTROL SIGNAL STATES

BACKGROUND OF THE INVENTION

A. Field of the Invention

This invention relates to data communication equipment.

B. Related Art

Apparatus which perform data communication operations over telephony lines are well known in the art. For example, it is known to provide a digital telephone with a data communication controller (DCC) which enables an attached computer to communicate with the digital telephone itself, or with another device (e.g. another computer) by way of a digital telephony line. Where data communication over an analog telephony line is desired, a modulator-demodulator (more commonly known as a "modem") is used to convert the digital computer generated signals into modulated analog signals for transmission over the analog telephony lines. A modem at a receiving station demodulates the analog signals and converts them back into digital form for use by a digital device at the receiving end of the telephony line.

DCCs and modems typically have two modes of operation: a "transparent mode" in which digital data from the sending device is passed through to the telephony lines (in analog form in the case of a modem), and a "command mode" in which the DCC or modem will accept commands from the sending device. For example, while in command mode the sending device may have the DCC dial a number or select an incoming or outgoing line on the digital telephone.

The prior art includes a number of ways of switching between transparent mode and command mode. For example, it is known in the art to have a modem switch from transparent mode to command mode upon recognition of a predefined escape sequence. The escape sequence may take a number of forms. For example, the escape sequence may take the form a non-printable character, such as "Ctrl-X" (the "X" key depressed along with the "Ctrl" key).

One problem with such escape sequences is that, while in transparent mode, if a sequence of characters matching the escape sequence happens to appear in the transmitted character stream, the DCC or modem may undesirably or unexpectedly change from the transparent mode to the command mode. Thus, in DCCs or modems where it is desired to transmit the escape sequence characters across the link while in transparent mode, special provision is made to distinguish a reception (from the computer) of the escape character sequence which is intended to be retransmitted as data, from reception of the same escape character sequence which is intended as a signal for the DCC or modem to switch from transparent mode to command mode.

The prior art includes a number of mechanisms for delimiting the "true" escape sequence from a sequence of characters to be retransmitted. For example, in synchronous protocols it is known to precede the escape sequence by predefined delimiter characters. For asynchronous transmissions, it is known in the art to provide a modem with a mechanism that escapes from transparent mode, if and only if the escape sequence is preceded and/or followed by a predetermined time period during which no characters are transmitted. Some escape mechanisms add the additional constraint that (in order to cause an escape) the characters in the escape sequence must arrive separated from one another in time by less than a predetermined time.

SUMMARY OF THE INVENTION

The present invention comprises a method and apparatus for escaping from transparent mode. According to an embodiment of the present invention the Data Communication equipment (DCE) will escape from transparent mode if the escape character sequence (the escape code) is received in coincidence with the toggling of a control signal such as Request To Send (RTS). Advantageously, this escape method can be used in conjunction with purely data based escape methods, such that a supervisor program or control device can force an escape notwithstanding user programmed time constraint parameters in the DCE.

BRIEF DESCRIPTION OF THE DRAWINGS

FIG. 2 is a flow chart of the operation of Data Terminal Equipment according to an embodiment of the present invention;

FIG. 3 is a timing diagram of the operation of the data communication device of FIG. 1;

FIG. 6 is a timing diagram of an alternative escape sequence to that of FIG. 3.

Like reference numerals appearing in more that one figure depict like elements.

DETAIL DESCRIPTION OF THE PREFERRED EMBODIMENTS

Figure 1:
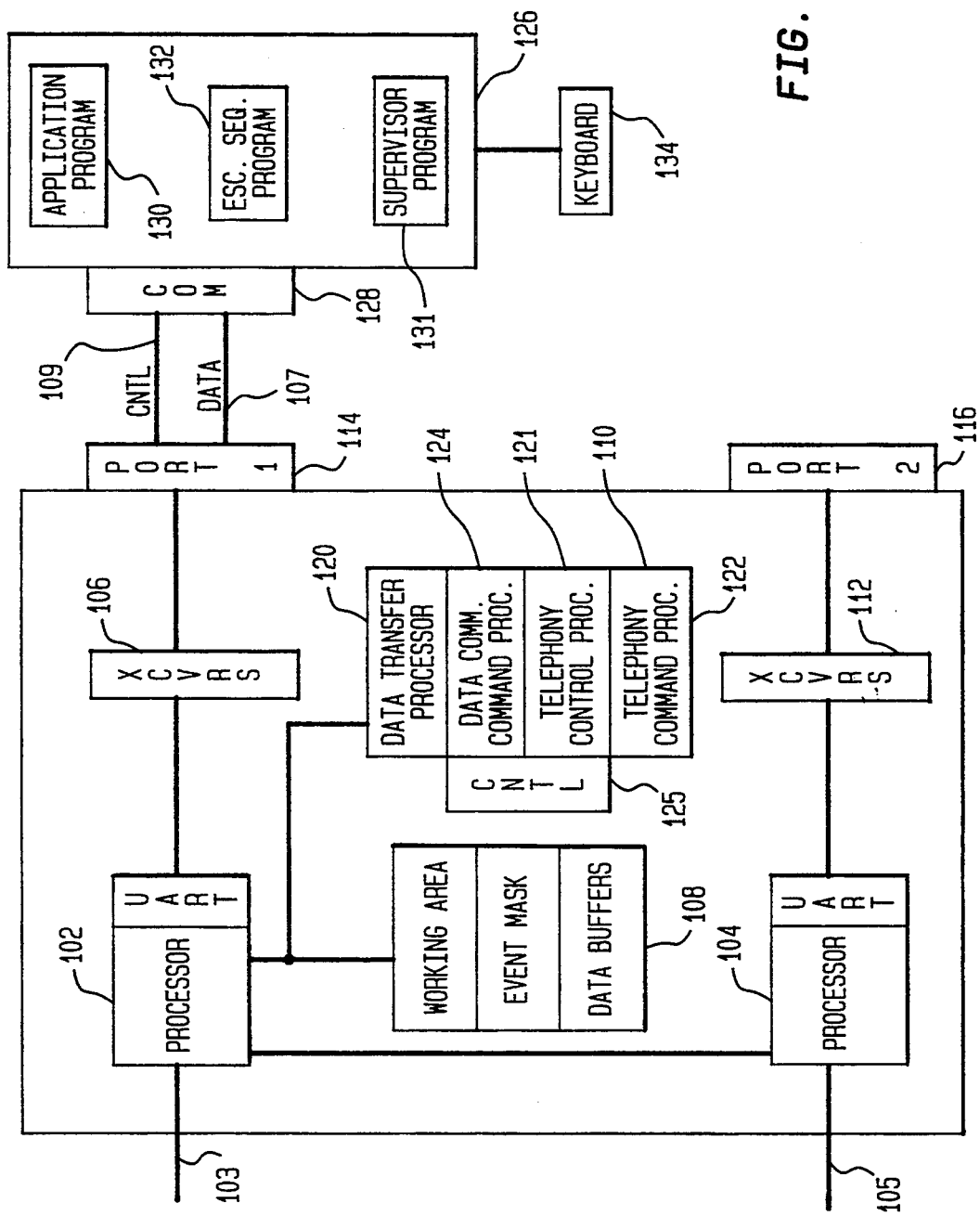
FIG. 1 is a functional block diagram of a data communication device according to an embodiment of the present invention.

Turning first to FIG. 1, a DCC of a type suitable for use with a digital telephone is illustrated. A suitable digital telephone is described, for example, in copending application Ser. No. 07/936,963; filed Aug. 28, 1992, which is incorporated by reference herein. The DCC includes two microprocessors 102, 104, each of which includes an internal Universal Asynchronous Receiver/Transmitter (UART). The primary microprocessor 102 (e.g. a Motorola 68302) is connected to the internal data bus 103 of a conventional digital telephone (not shown), the secondary microprocessor 104, a set of RS-232 transceivers 106, a random access memory (RAM) 108 and a read only memory (ROM) 110.

The secondary microprocessor 104 (e.g. a Motorola 6805) is connected to the primary microprocessor 102, the control bus 105 of the conventional digital telephone and a second set of transceivers 112. The transceivers 106, 112 are, in turn, respectively connected to a first RS-232 port (PORT1) 114 and a second RS-232 port (PORT2) 116. The secondary microprocessor 104 serves as a conduit between the primary microprocessor 102, and the control bus 105 and second RS-232 port 116. The secondary microprocessor 104 includes internal code to pass ISDN call status events (received from the network via the control bus 105) to the primary microprocessor 102 and to pass commands and responses between the second RS-232 port 116 and the primary microprocessor 102.

The RAM 108 provides workspace for the primary microprocessor and includes a data buffer area for the RS-232 ports. The ROM 110 includes a number of programs (subroutines or processes) which are executed by the primary microprocessor 102. These processes include a data transfer processor 120, a telephony control processor 121, a telephony command processor 122 and a data communication command processor 124.

The data transfer processor 120 is a timer driven interrupt routine. The timer (which can be externally generated or internal to the primary microprocessor) runs at a sufficient rate to handle the necessary data transfer speeds on the RS-232 ports and the telephony link. The data communication command processor 124 and the telephony control processor 121 run in a main control loop 125, each processing one piece of information if any is present and then passing control to the next process. The data communication command processor 124 calls the telephony command processor 122 whenever a user enters a telephony command set (described in more detail later).

The data transfer processor 120 handles normal data transfers between the data bus 103 and the RS-232 communication ports 114, 116. The data transfer processor 120 also includes code for processing the escape sequence which enables a user or applications program, connected via an RS-232 port, to change the DCC from transparent mode (controlled by the data transfer processor) to command mode (controlled by either the telephony command processor or the data communication command processor).

The data communication command processor 124 handles data communication commands of the type well known in the art. The commands are sent by a connected apparatus (e.g. a workstation) via an RS-232 port. On power up, the DCC defaults to command mode and the data communication command processor 124. The data communication command processor controls the DCC in response to commands in accordance with the conventional "AT" command set, with extensions for activating the telephony command processor(s).

The telephony control processor 121 handles the telephony protocol that is received from the telephony network link. It interprets and responds to telephony commands such as LED cadence commands and ISDN call status events. In addition, the telephony control processor 121 sends information from the telephone to the link, such as information resulting from key depressions.

The telephony command processor 122 handles telephony commands. Like the data communication commands, the telephony commands are sent by a connected apparatus via an RS-232 port. Once in command mode, a user can activate the telephony command processor set by keying the proper AT command sequence (e.g. AT%U). The telephony command processor can include more than one telephony command set, each of which can be entered by way of a distinct AT command.

A computer workstation 126 can be coupled to either of the DCC's communication ports 114, 116 by way of its own RS-232 data communication port 128. An application program 130, executing on the workstation 126, can send commands and data to the DCC via the workstation's RS-232 port 128. In accordance with the RS-232 standard, the connection between the workstation communication port and the DCC communication port includes data lines 107 (which carry transmitted and received data) and control lines 109 (which carry the RS-232 control signals, such as Data Terminal Ready, Data Set Ready, Clear To Send, and Request To Send).

The escape sequence of the present invention can be implemented in a number of different ways. According to a first embodiment, as illustrated in FIG. 2, when the data terminal equipment (DTE) wants to cause the Data Communication Equipment to escape from transparent mode, it first switches the RTS signal from ON to OFF (Step 202). Next, while maintaining the RTS signal in the OFF state, the DTE sends a predetermined sequence of characters (the escape code) over the transmit signal line (Step 204). Finally, after the last character in the escape sequence has been transmitted and before any additional characters are transmitted, the DTE switches the RTS signal from OFF to ON (Step 206). Of course the above description implies that the RTS signal must be ON before and after transmission of the escape sequence.

A timing diagram of the above-described escape sequence showing the toggling of the RTS signal 302 is illustrated in FIG. 3. Characters on the DTE's transmitted data line (TxD) are indicated by reference numerals 304, 306 and 308. Before the RTS signal 302 drops to the OFF (low) state, data 304 is sent on the TxD line and the Data Communication Equipment (DCE) is in transparent mode. After RTS is turned OFF, the DTE sends the escape code 306 ("XXX" in the present example) on the TxD line. Next, following the transmission of the escape code, and before any additional characters are sent (by the DTE), the DTE switches the RTS signal 302 to the ON (high) state. In response, the DCE switches from transparent mode to command mode and the DTE can begin to send a command sequence 308 on the TxD line.

FIG. 6 is a timing diagram of an alternative escape sequence to that of FIG. 3. In the escape sequence of FIG. 6, the RTS waveform is toggled during the course of transmission of the escape code 306. As a further alternative embodiment, a plurality of control signals (such as RTS and DTR) can be monitored for one or more state changes in conjunction with reception of the escape code in order to effectuate an escape.

In order to maintain compliance with the RTS specification in the EIA-232-D standard, it is preferable that the RTS signal be maintained in the ON state whenever characters (other than the escape sequence) are being transmitted. It should be understood, however, that in systems which do not strictly follow the EIA-232-D standard, the RTS signal can generally be OFF and then turned ON a short time before transmitting the escape sequence. In any event, the RTS signal must be turned ON for a long enough period of time, before the escape sequence is transmitted, to be detected by the escape mechanism.

Figure 4:
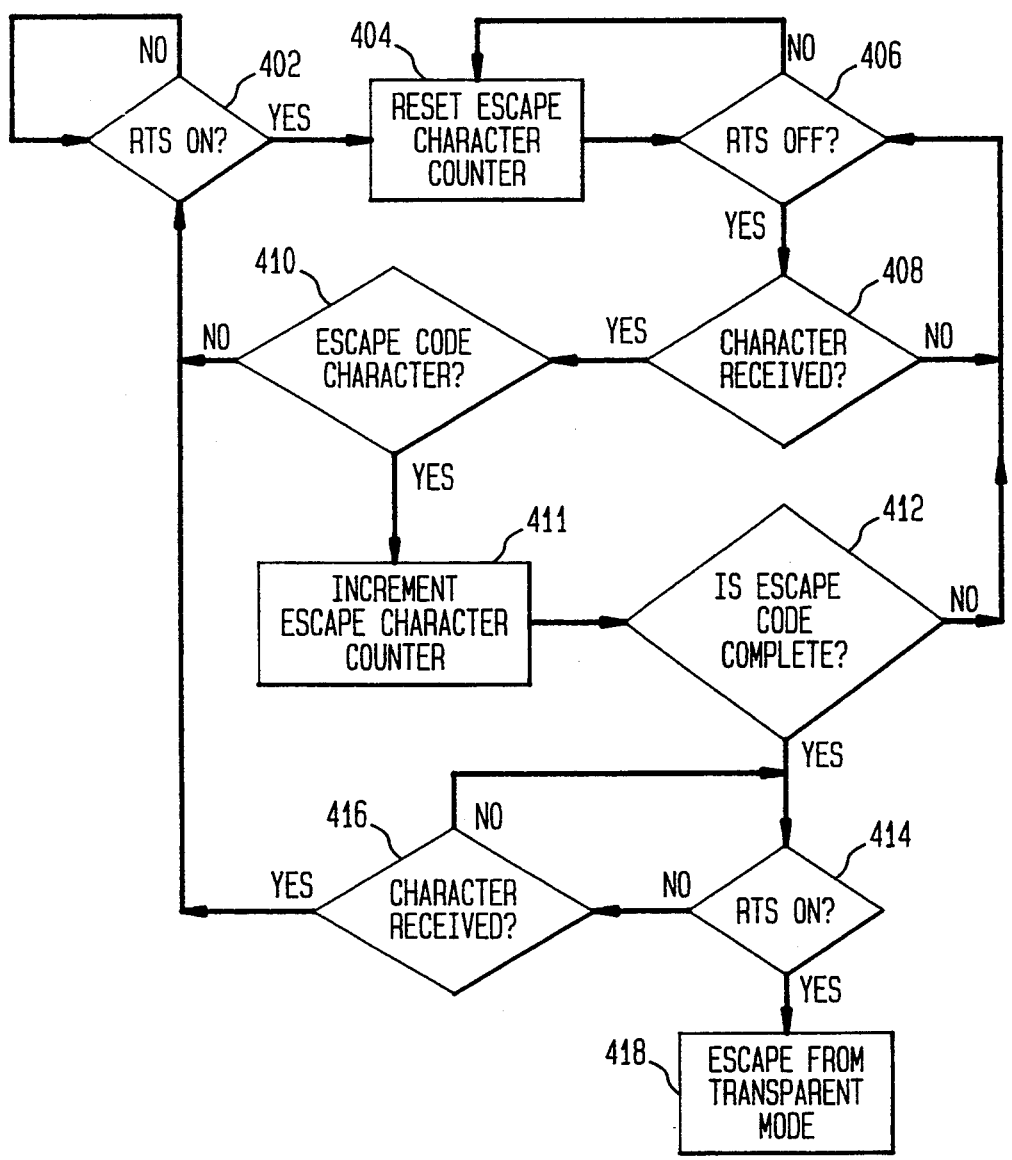
FIG. 4 is a flow chart of the operation of Data Communication Equipment of FIG. 1.

The operation of the Data Communication Equipment (the DCC in the presently described embodiment) is illustrated in FIG. 4 From the perspective of the Data Communication Equipment, the RTS signal is perpetually monitored during character transmissions. RTS must first be ON before any escape can be detected. When RTS is detected to be ON (step 402), the escape detection mechanism is armed and an escape character counter is reset (step 404). While monitoring the RTS signal (step 406) the escape detection mechanism monitors the transmitted data line (TxD) for incoming characters from the DTE (step 408). If a character is received it is compared to the specified escape code (step 410). If the character matches an escape code character, then the escape character counter is incremented (step 411). If the complete escape code has not been received (step 412) the detection mechanism resumes monitoring of RTS and TxD (steps 406 and 408). If the character checked in step 410 is not part of the escape code, then the escape fails, the DCE remains in transparent mode and the detection mechanism returns to step 402 to wait for RTS to be ON again.

Once the escape code is determined to be complete (step 412), the detection mechanism waits for RTS to be ON (step 414). If any character is received before RTS is ON (step 416), then the escape fails, the DCE remains in transparent mode and the detection mechanism returns to step 402 to wait for RTS to be ON again. If (in step 414) it is determined that RTS has been turned on before any further characters have been received on the TxD line, the escape is considered to be complete and the DCE switches to command mode (step 418).

It should be understood that the escape code need not be a repetition of the same character. In embodiments where a nonrepetitive escape code (such as "ABC") can be chosen, step 410 will also check to ensure that the escape characters are received in proper sequence. If an escape character is received out of sequence, the detection mechanism will return to step 402.

The present escape sequence can be generated in a number of different ways. In one embodiment, a callable program ("the escape program") 132 is provided in the workstation 126 to toggle RTS and send the escape sequence in the appropriate timing. The escape program can then be called by an application program or the operating system (supervisor program 131) whenever an escape from transparent mode needs to be accomplished. Further, the operating system 131 or application program 130 can be set up to call the escape program in response to user depression of a predetermined key or keys on a keyboard 134. As an alternative embodiment, the appropriate communication port control instructions can be embedded directly into the supervisor or user program.

Figure 5:
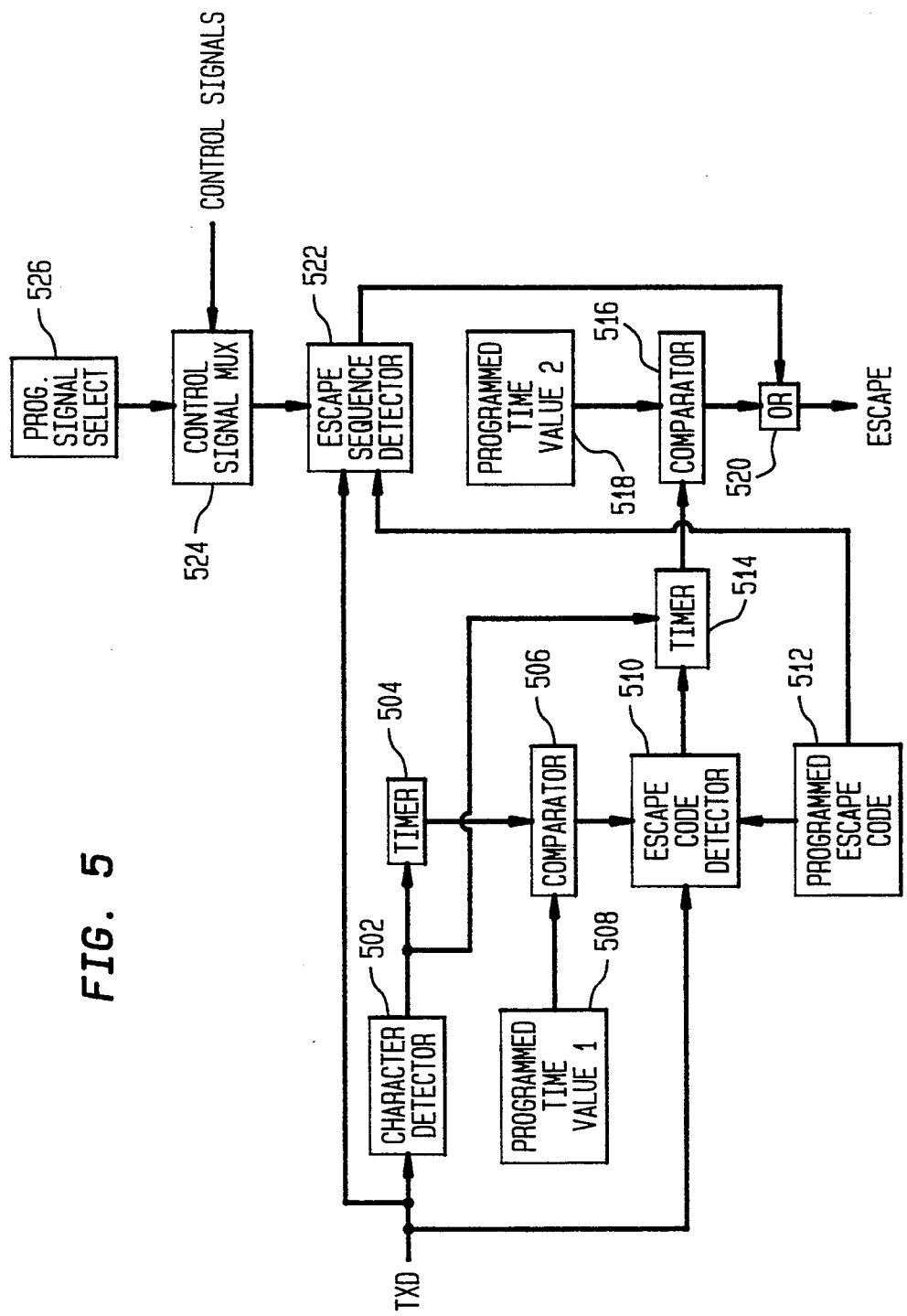
FIG. 5 is a logic diagram of an alternative embodiment of the present invention.

Advantageously, the above-described escape sequence can be used as an alternate escape sequence in conjunction with a time/data based escape sequence. For example, the DCE can be programmed to escape when the escape code is preceded and/or followed by a predetermined (user programmed) time period of no characters OR when RTS is toggled in coincidence with reception of the escape code as described above. A functional block diagram for such an embodiment is illustrated in FIG. 5.

A character detector 502 produces a pulse each time a character has been received on the DCE's RxD line. The pulse from the character detector 502 resets and starts a timer 504 which is, in turn, connected to a comparator 506. The comparator 506 compares the time between character transmissions with a first user programmed time value which is stored within a first register 508. When the time between characters equals or exceeds the first user programmed time value, it produces a signal which enables (turns on) an escape code detector 510. The escape code detector monitors the RxD line and produces a pulse when a string of received characters matches a user programmed escape character sequence which is stored in a second register 512. The pulse from the escape code detector resets and starts a second timer 514. It is noted here that the escape code detector resets and turns itself OFF if the escape sequence is not received as the first set of characters subsequent to its being turned ON.

The second timer 514 stops counting and resets when a character is received on the RxD line (as detected by the character detector 502). A second comparator 516 compares the output of the second timer (which measures the time between reception of the escape data sequence and the reception of a subsequent character) with a second user programmed time value which is stored within a third register 518. The comparator produces a signal which indicates when the time between reception of the escape code and the reception of a subsequent character equals or exceeds the second user programmed time value. It will be appreciated here that the first (predecessor) time value need not equal the second (successor) time value. It will also be appreciated that in embodiments where one always wants the predecessor and successor time values to be equal, a single register can be used. This signal is provided as one input of a two input OR gate 520.

An Escape Sequence Detector 522 monitors for reception of the escape code in coincidence with toggling of a control signal (such as RTS) as described with respect to FIGS. 2-4. A control MUX 524 is programmed by a user (via a register 526) to select any one of the RS-232 control signals available on the RS-232 communication lines connecting the DTE and the DCE. Thus, advantageously, a user can select a signal other than RTS to monitor for the escape. The output of the escape sequence detector 522 is connected to the second input of the OR gate 520. Thus, when either escape sequence is detected (the toggling of a control signal in conjunction with reception of the escape data OR the escape data immediately preceded and succeeded by a predetermined period of time during which no characters are received) the DCE will escape from transparent mode and enter command mode. As a further modification to the embodiment of FIG. 5, two separate escape sequence character registers can be provided such that the two escape sequences can use different escape character strings.

It should be understood that the logic of FIG. 5 can be embodied in the programming code of the primary microprocessor 102 of FIG. 1. Further the mechanism of FIG. 5 can include the additional constraint that (in order to cause an escape) the characters in the escape sequence must arrive separated from one another in time by less than a predetermined period of time.

The advantage of the embodiment of FIG. 5 (or its programmed equivalent) is that a supervisor program or control hardware can force an escape when needed without regard to and without disturbing the user programmed time periods.

Now that the preferred embodiments have been described, various modifications and improvements that do not depart from the scope or spirit of the invention will occur to those of skill in the art. Thus, it should be understood that the preferred embodiments have been described by way of example and not by way of limitation. The scope of the present invention is defined by the appended claims.

We claim:

1. In a data communication device including an input port for connecting the data communication device to a utilization device and a telephone port for connecting the data communication device to a telephone line; the data communication device having two distinct modes of operation: a transparent mode in which the data communication device provides data received at the input port to the telephone port, and a command mode in which the data communication device responds to the data received at the input port as instructions to the data communication device; the data communication device including means for defining a predetermined sequence of data as an escape code; the improvement comprising:

reception means for receiving at least one control signal from the utilization device;

coincidence detection means for detecting when a predetermined sequence of state changes of the at least one control signal occur in coincidence with reception of the predetermined sequence of data;

escape control means, responsive to the means for detecting and operative when the data communication device is in the transparent mode, for causing the data communication device to switch to the command mode when the predetermined sequence of state changes of the at least one control signal occur in coincidence with reception of the predetermined sequence of data.

2. The apparatus of claim 1 wherein the reception means comprises a user programmable multiplexor connected to receive a plurality of control signals from the utilization device; the multiplexor being operative to output a user selected one of the control signals to the coincidence detection means.

3. The apparatus of claim 1 wherein the at least one control signal is Request To Send.

4. The apparatus of claim 1 wherein the coincidence detection means comprises means for detecting a change of state of the at least one control signal, both preceding and succeeding reception of the escape code and without reception of any intervening characters.

5. The apparatus of claim 4 wherein the coincidence detection means further detects a change of state of the at least one control signal during reception of the escape sequence.

6. The apparatus of claim 5 wherein the at least one control signal is Request To Send.

7. In a data communication device (DCE) including an input port for connecting the data communication device to a utilization device and a telephone port for connecting the DCE to a telephone line; the DCE having two distinct modes of operation: a transparent mode in which the DCE provides to the telephone port, data characters defined by data signals received at the input port; and, a command mode in which the DCE responds to the data signals received at the input port as instructions to the DCE; the DCE including:

means for defining a predetermined sequence of the data signals as an escape code;

means for detecting each occurrence of a passage of a predetermined period of time after provision of one of the data signals to the input port;

the improvement comprising:

reception means for receiving at least one control signal from the utilization device;

coincidence detection means for detecting when a predetermined sequence of state changes of the at least one control signal occur in coincidence with reception of the predetermined sequence of data;

escape control means, responsive to the means for detecting and operative when the DCE is in the transparent mode, for causing the DCE to switch to the command mode when:

a) the predetermined sequence of state changes of the at least one control signal occur in coincidence with reception of the predetermined sequence of data; or, b) the predetermined sequence of data signals occurs contiguous in time with at least one occurrence of the passage of the predetermined period of time during which none of the data signals are provided to the input port;

and, in an absence of both of conditions a and b, causing the DCE to remain in the transparent mode.

8. The apparatus of claim 7 wherein the reception means comprises a user programmable multiplexor connected to receive a plurality of control signals from the utilization device; the multiplexor being operative to output a user selected one of the control signals to the coincidence detection means.

9. The apparatus of claim 7 wherein the at least one control signal is Request-To-Send.

10. The apparatus of claim 7 wherein the coincidence detection means comprises means for detecting a change of state of the at least one control signal, both preceding and succeeding reception of the escape code and without reception of any intervening characters.

11. The apparatus of claim 10 wherein the coincidence detection means further detects a change of state of the at least one control signal during reception of the escape code.

12. The apparatus of claim 10 wherein the at least one control signal is Request To Send.

13. A Data Terminal Equipment (DTE) apparatus for use in conjunction with Data Communication Equipment (DCE) having an input port and an output port and two distinct modes of operation; a transparent mode in which the DCE provides to the output port, data characters defined by data signals received at the input port; and, a command mode in which the DCE responds to the data signals received at the input port as instructions to the DCE; the DTE comprising:

a communication port comprising a control line and at least one data line;

data transmission means for sending data characters on the at least one data line; and, escape sequence transmission means for toggling a control signal transmitted on the control line in coincidence with transmission of an escape code on the data line such that the DCE will switch from the transparent mode to the command mode in response thereto.

14. The apparatus of claim 13 wherein the DTE includes key means for activating the escape sequence transmission means in response to one or more keystrokes entered by a user.

15. The apparatus of claim 13 wherein the control signal is Request To Send.

16. The apparatus of claim 13 wherein the escape sequence transmission means changes the control state signal during transmission of the escape code.

17. The apparatus of claim 16 wherein the DTE is a computer workstation and the DCE is an integral part of a digital telephone.

* * * * *